United States Patent
Badarneh

(10) Patent No.: US 6,292,562 B1
(45) Date of Patent: Sep. 18, 2001

(54) KEYPAD FOR TELEPHONES AND THE LIKE

(75) Inventor: Ziad Badarneh, Oslo (NO)

(73) Assignee: Telenostra AS, Oslo (NO)

( * ) Notice: Subject to any disclaimer, the term of this patent is extended or adjusted under 35 U.S.C. 154(b) by 0 days.

(21) Appl. No.: 09/077,665

(22) PCT Filed: Dec. 3, 1996

(86) PCT No.: PCT/NO96/00282

§ 371 Date: Jun. 3, 1998

§ 102(e) Date: Jun. 3, 1998

(87) PCT Pub. No.: WO97/21295

PCT Pub. Date: Jun. 12, 1997

(30) Foreign Application Priority Data

Dec. 4, 1995 (NO) ....................................................... 954911

(51) Int. Cl.[7] .................................................. H04M 1/00
(52) U.S. Cl. ............................................. 379/433; 379/368
(58) Field of Search ..................................... 379/368, 369, 379/370, 433, 428, 456; 455/575, 90; 200/6 A

(56) References Cited

U.S. PATENT DOCUMENTS

| 4,044,242 | 8/1977 | Laesser . | |
|---|---|---|---|
| 4,272,826 | 6/1981 | Deutsch . | |
| 4,726,687 | 2/1988 | Gander . | |
| 4,739,128 | * 4/1988 | Grisham | 200/6 A |
| 5,210,790 | 5/1993 | Lin . | |
| 5,235,636 | 8/1993 | Takagi et al. . | |
| 5,742,912 | * 4/1998 | Nishiyama et al. | 379/433 |
| 5,966,671 | * 10/1999 | Mitchell et al. | 455/575 |

FOREIGN PATENT DOCUMENTS

| 6-14092 | * 1/1994 | (JP) | 379/433 |
|---|---|---|---|
| WO 95/01689 | 1/1995 | (WO) . | |

* cited by examiner

Primary Examiner—Jack Chiang
(74) Attorney, Agent, or Firm—Browdy and Neimark, PLLC

(57) ABSTRACT

A keypad for telephones and the like, preferably mobile telephones. There is provided at least one actuating mechanism (1) for stepwise input of call symbols. There is provided an additional mechanism for confirming the respective stepwise selected symbols or this consists of the actual actuating mechanism, pressure on or bending of the actuating mechanism causing the selection of symbols to be carried out. The actuating mechanism may consist of the telephone housing in that the housing is divided into an upper part (5) and a lower part (4) which are rotatable relative to one another, by a wheel (1) that is rotatable relative to the housing, and that is provided with call symbols or interacts with a scale provided with call symbols, a sliding key which can be moved in a groove provided in the telephone housing or on a slide bar affixed to the housing, or one or more keys for moving a marker in a menu on a display device (3).

7 Claims, 8 Drawing Sheets

KEYPAD FOR TELEPHONES AND THE LIKE

FIELD OF INVENTION

The present invention relates to a keypad for telephones and similar devices where it is necessary to key in several character symbols in order to use the device of the type having an actuating means provided in or on a housing for stepwise input of symbols and means for confirming the respective stepwise selected symbols.

BACKGROUND

Recently, mobile telephones have become increasingly common, and the most popular model is that which is light and small and which the user can easily carry around with him.

However, the keypad has proven be a limiting factor for miniaturisation. In the smallest telephones found on the market, the keypads have already been found to be difficult to use because the keys are too small.

An example of a previously known keypad which to a certain degree solves this problem on a bracelet-mounted calculator is taught in U.S. Pat. No. 4,044,242. The keys here are replaced by two sliding means which are slid into a position on a scale corresponding to a desired symbol, and by pressing the sliding means the symbol is fed to the calculating part of the calculator at the same time as the symbol is displayed on a display device. In this known device, the means for transferring the chosen symbol to the calculator is connected to the sliding means so that when the sliding means is pressed the transfer takes place. This is a rather unsuitable solution as unintentional transfer of a symbol can easily take place, which is especially the case when the apparatus is kept in a pocket, bag or similar, i.e., not used as prescribed in the patent publication. This solution is thus not suitable for mobile telephones or similar handcarried units.

SUMMARY OF INVENTION

An objective of the present invention is to provide a keypad which can be used on handheld devices such as mobile phones, and which make possible the manufacture of, e.g., mobile phones as small as a fairly large pen, which can be used by anyone, even a person with quite large fingers without any problems.

The present invention provides a keypad of the type mentioned above which avoids the drawbacks of the previously known devices and which is characterised by only one means for stepwise input symbols, and wherein the confirmation means consists of the means for stepwise input or of a separate means, said latter means being actuatable using the same hand as that holding the telephone.

In this design of the keypad, less material is used and there are fewer devices on the apparatuses, which means that they can be produced more cheaply. The keypad according to the invention not only allows the apparatuses to be made smaller, but also makes possible completely new constructions/design as mentioned above, e.g., a mobile telephone shaped like a ball-point pen. Handheld apparatuses can be made lighter as the housing becomes smaller, which means that handheld apparatuses can more easily be operated with one hand. This results in greater safety, when using, e.g., a mobile telephone in road traffic.

The keypad according to the invention can be used in the majority of areas where keypads having keys or buttons have hitherto been used for selecting individual numbers or letters. By way of example, mention can be made of mobile telephones, cordless telephones, remote controls for televisions and hi-fi and so forth. The mechanics-tele-electronics that are used inside the apparatuses with known push keypads can in principle be used with the keypad according to the invention.

BRIEF DESCRIPTION OF DRAWING

The invention will now be described in more detail with reference to the drawings, wherein.

DETAILED DESCRIPTION OF EMBODIMENTS

Figure 1:
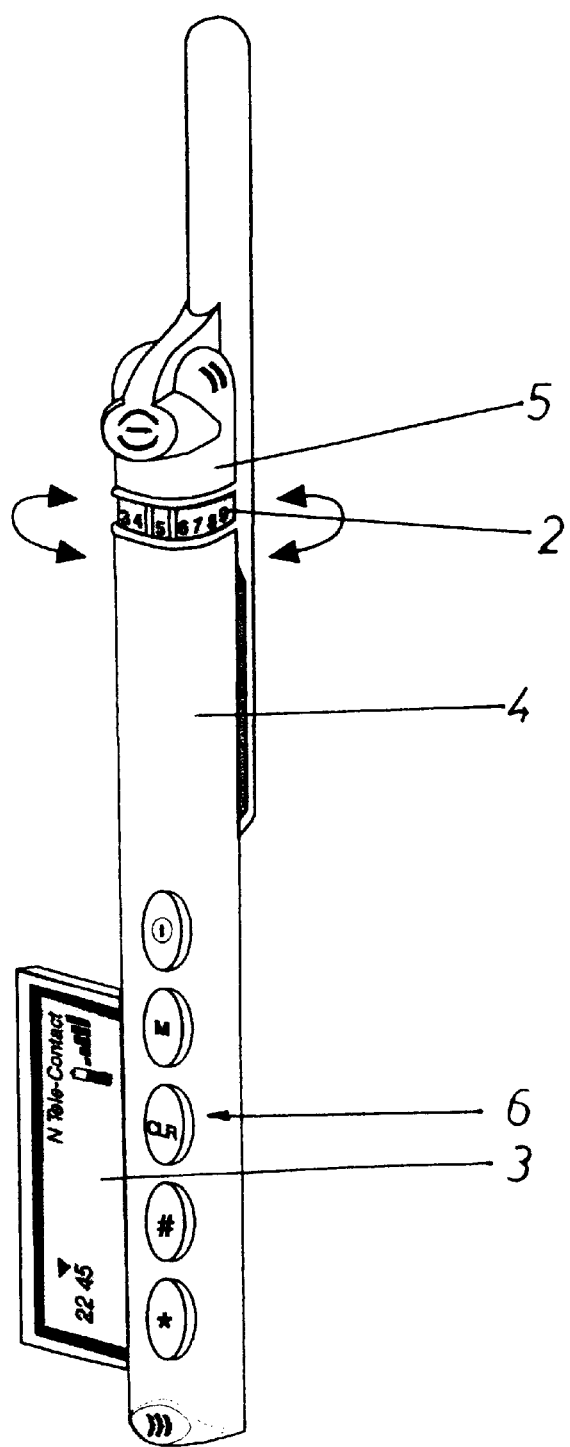
FIG. 1 shows an embodiment of the keypad in the form of a rotary keypad on a mobile telephone fashioned like a ball-point pen.

FIG. 1 shows an embodiment of the present invention where the actuating means consists of the actual housing of the telephone which consists of an upper part 5 and a lower part 4 which are rotatable relative to each other. In the gap between the two housing parts 4, 5 there is provided a scale 1 of symbols, which, when using the device as a telephone, are the call symbols, i.e., the symbols which may occur in a telephone number. The scale 1 may be affixed to one of the housing parts 4, 5.

One of the housing parts may have a marker which points towards the scale 1, so that when the one housing part is turned relative to the other, the marker will point towards the selected symbol. It will also be possible to connect the turning position to an electronic unit that is known per se which highlights the respective selected symbols.

The selected symbol is fed to a display means 3 of a commonly known type, which today is used in the majority of mobile telephones, in that an actuating means suitable for the purpose is operated. This actuating means may be an extra key for this purpose, or the one housing part is bent relative to the other housing part and thus actuates an inbuilt key. The one housing part will in this case be connected in a hinge-like manner to the other housing part, so that when the one housing part is bent relative to the other housing part, a key inside the housing will be actuated.

The stepwise selected symbols, which appear automatically on the display device can automatically be transmitted as a telephone number as they are selected or transmitted once selection is completed by actuating a key for this purpose.

The, e.g., lower part 4 of the telephone housing may also be provided with additional keys 6 according to need: a # key, a * key, a clear key and so forth. In spite of these extra keys 6, the number of keys is still reduced so much that this does not affect the size of a telephone or the necessary keys.

The connection between the respective actuating means, keys and the actual telephone unit, and the display devices are considered to be technically obvious and can be carried out using commonly known art within the construction of a telephone, and will therefore not be described in any more detail in connection with this embodiment or any of the subsequent embodiments.

Figure 2A:
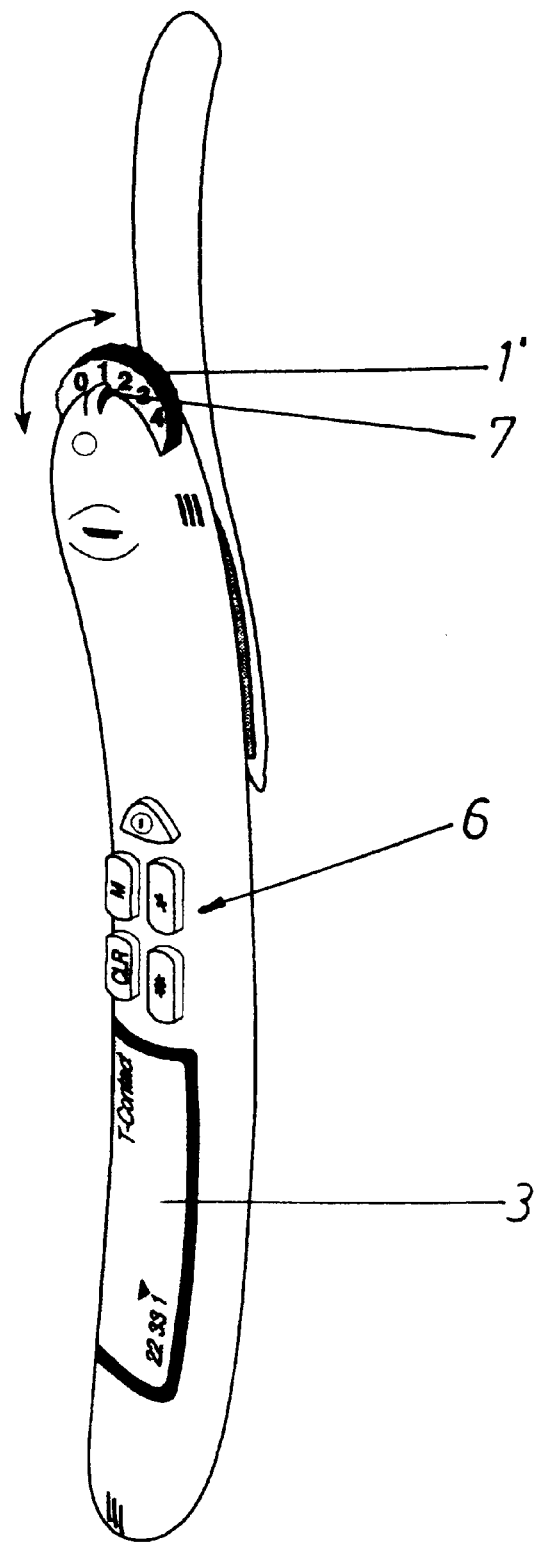
FIGS. 2a and 2b show two respective embodiments of the keypad in the form of a wheel keypad on a mobile telephone fashioned like a ball-point pen.
Figure 2B:
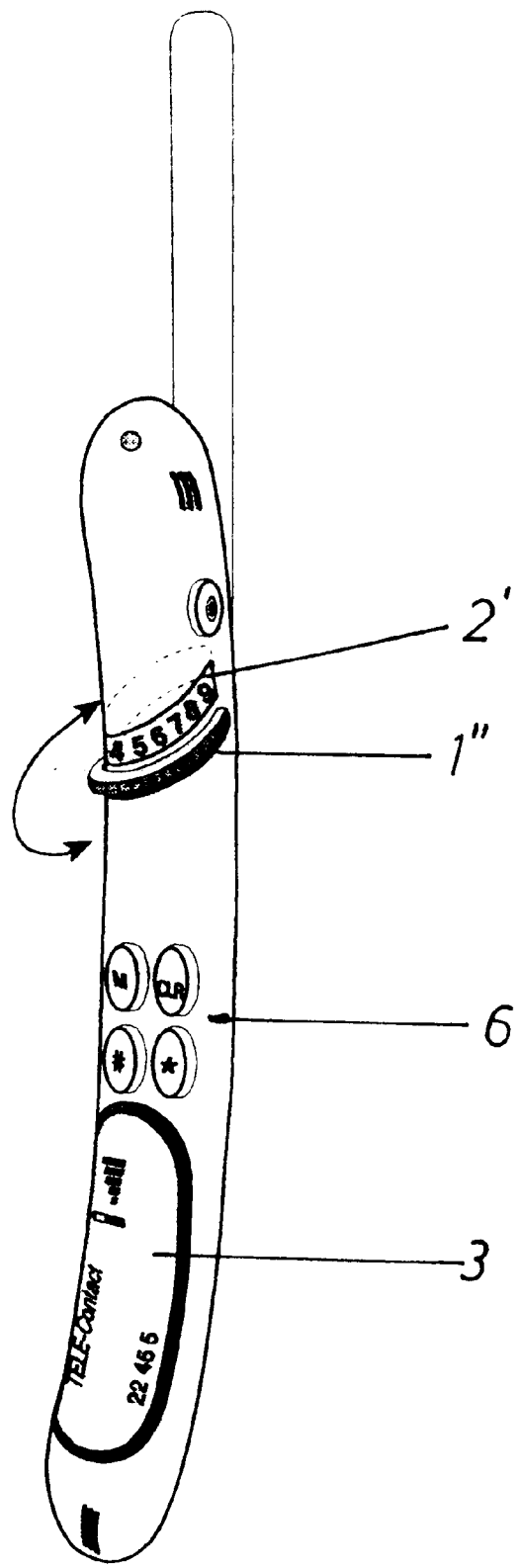

FIGS. 2a and 2b show an embodiment of the keypad in the form of a wheel 1', 1" on a mobile telephone fashioned like a ball-point pen.

In FIG. 2a the wheel 1' is shown projecting from the upper part of the housing with the symbols on the wheel 1' and an arrow marker 7, which shows the selected symbol when the wheel 1' is turned.

The wheel may also be sunk into the housing as shown in FIG. 2b. In this case a scale 2' is provided, which indicates a selected symbol in the same way as described when referring to FIG. 1.

The determination of a symbol in the form of, e.g., a letter or number, may take place by pressing the wheel 1', 1" or by using a separate button suitably located on the housing.

The two embodiments described here may also have a display device 3 and extra keys 6 as described when referring to FIG. 1.

FIGS. 3a to 3d show the keypad in the form of a sliding key 8 having different embodiments in connection with a mobile telephone.

Figure 3A:
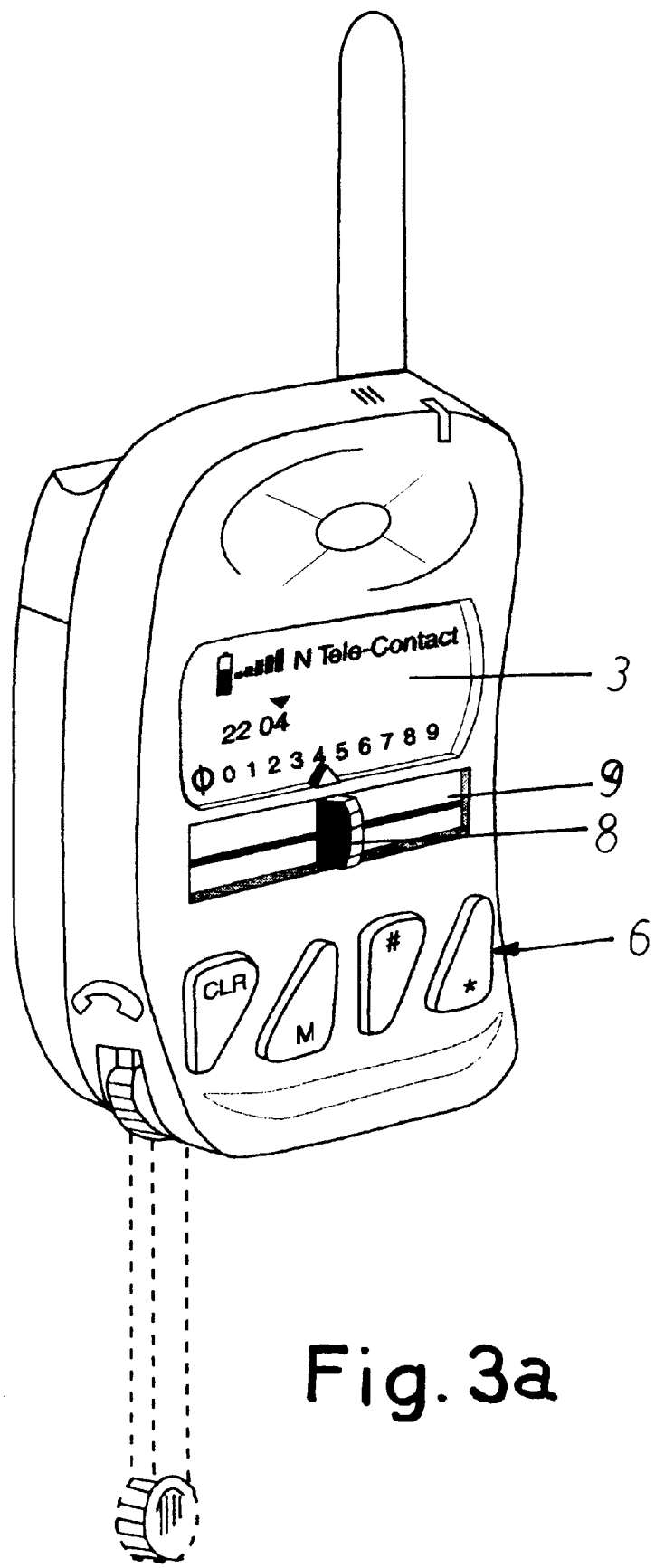
FIGS. 3a to 3d show the keypad in the form of a sliding key having a different embodiments in connection with a mobile telephone.
Figure 3B:
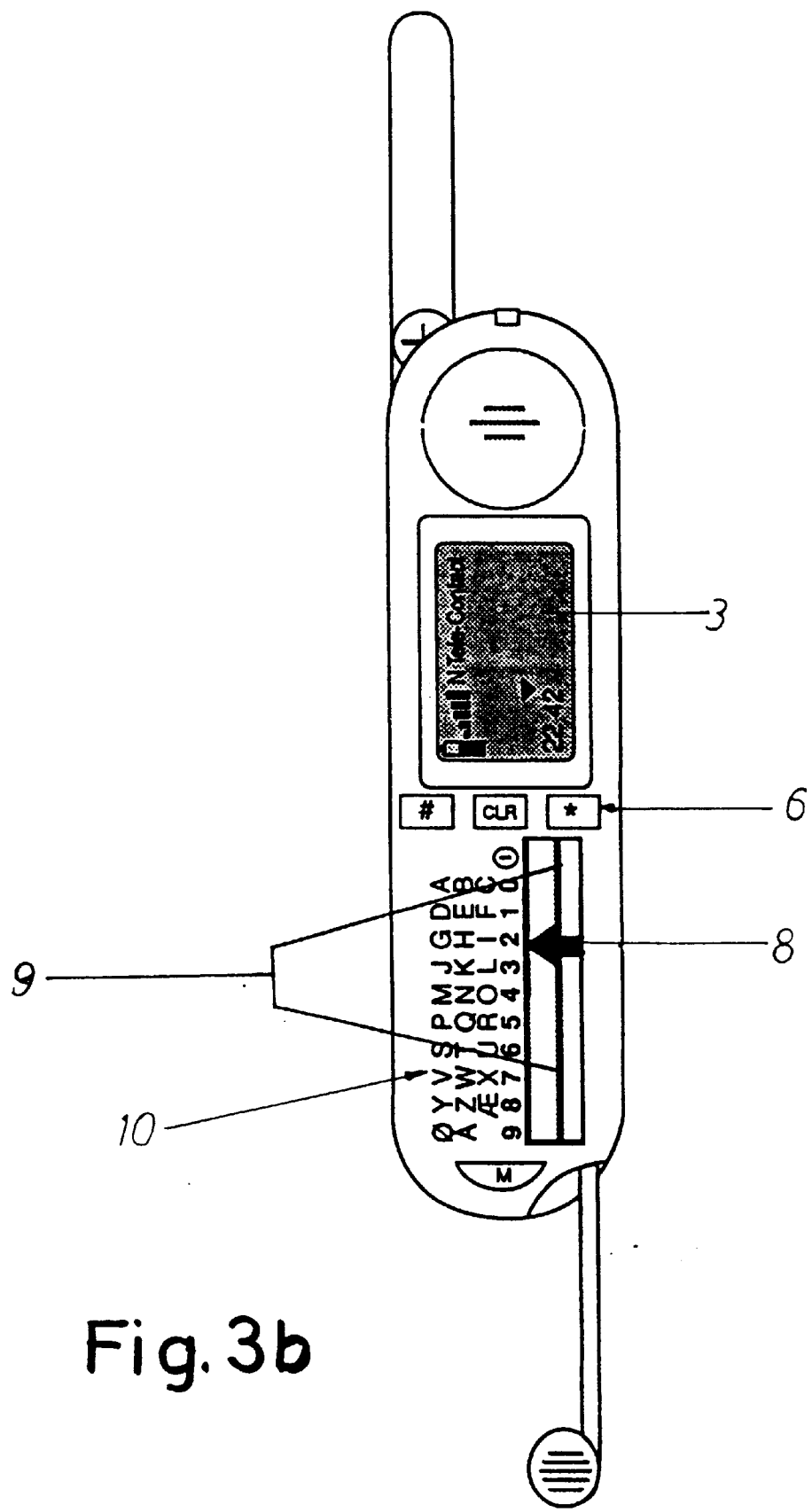
Figure 3C:
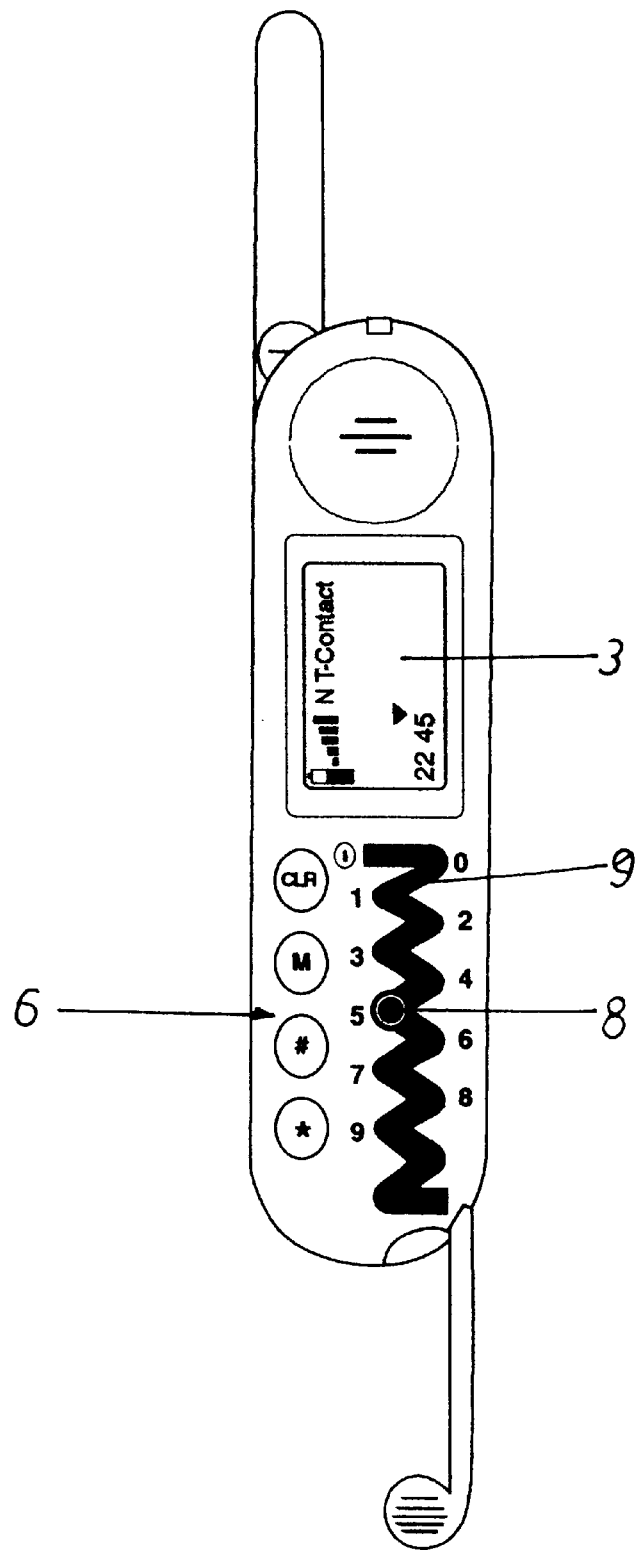
Figure 3D:
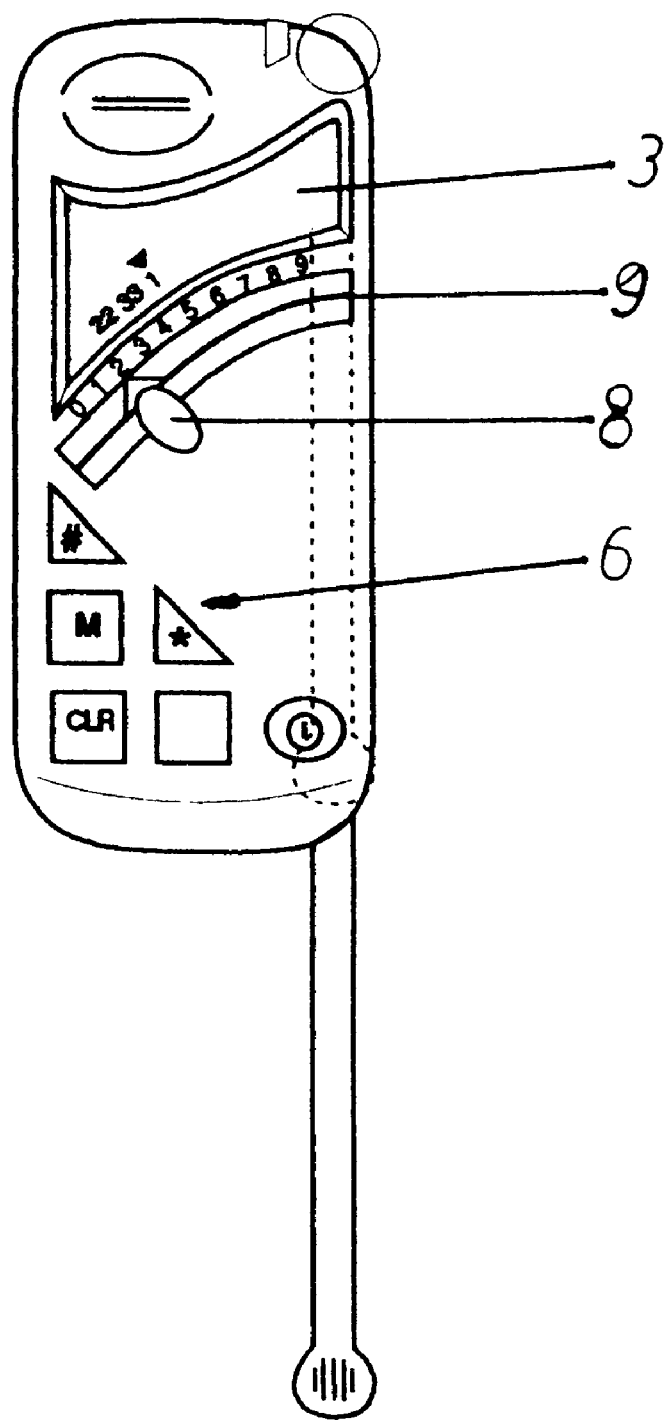

In these embodiments, the actuating means consists of a sliding means 8 which can be moved in a groove or along a slide bar 9. The groove 9 may be straight (FIGS. 3a and 3b), curved (FIG. 3d) or non-linear, of which an example is shown in FIG. 3c. The groove or slide bar 9 may be constructed as a part of the apparatus housing as a more or less open groove 9 or in the form of a slide bar affixed to the housing. The symbols may be marked along the groove or slide bar 9 on the housing or even on the actual display means 3 as shown in FIG. 3a. Confirmation of the selected symbol may take place by pressing the sliding means 8, bending the sliding means up or down, or by operating a key designated for this purpose, that is to say in principle in the same way as described in connection with the aforementioned embodiments.

Figure 4:
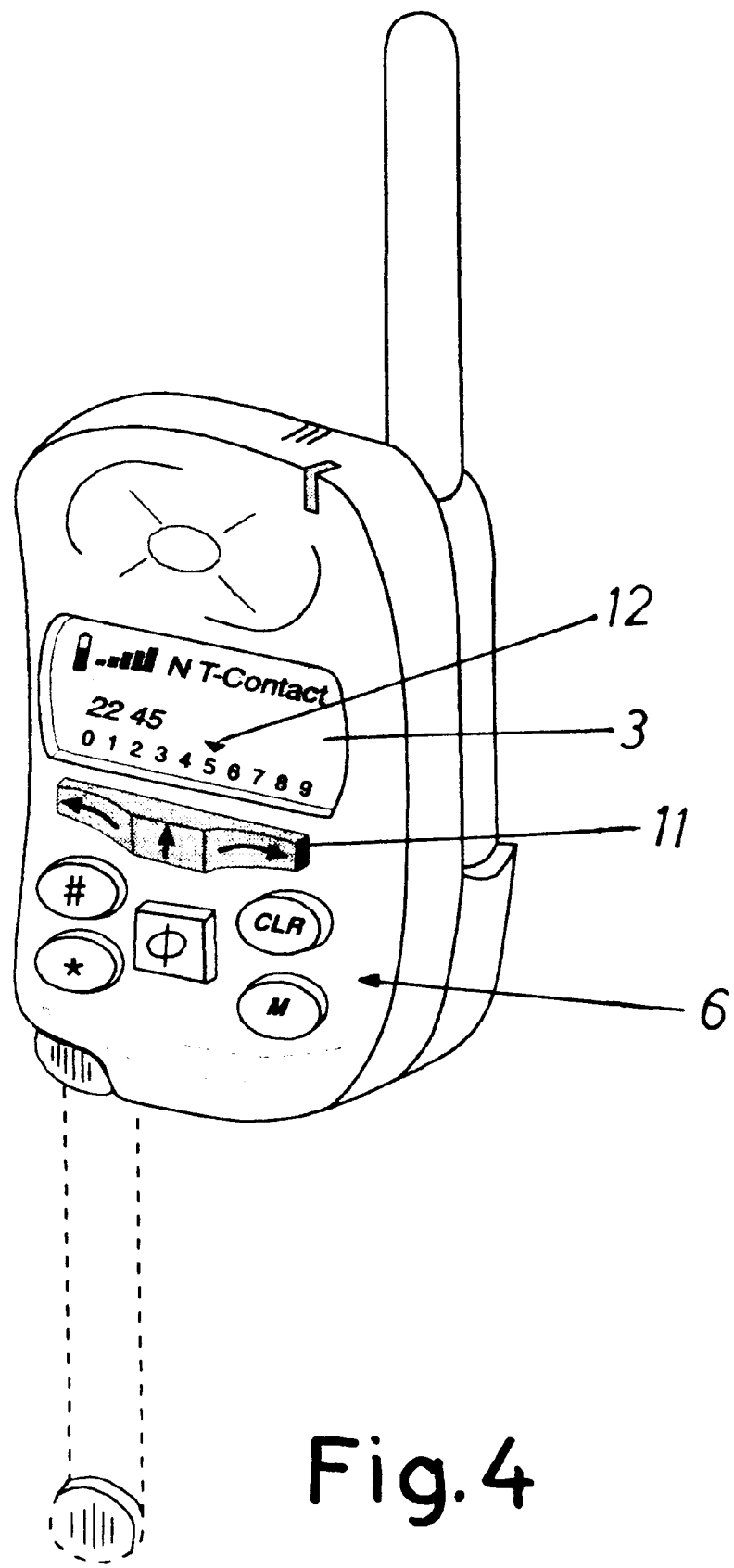
FIG. 4 shows the keypad in the form of arrow keys in connection with a mobile telephone.

FIG. 4 shows a keypad in the form of arrow keys in connection with a mobile telephone. The actuating means here consists of a type of toggle key 11. By pressing the key 11 on the arrows towards left and right respectively, the arrow 12 on the display means 3 will be moved along the symbols shown. The symbol is selected by pressing on the centre of the toggle key 11. The toggle key 11 may also be replaced by three keys.

By using only one of the three keys 11, it will thus be possible to select symbols in a display means by moving the arrow backwards and forwards in a menu in the display means 3. This entire operation requires much less space and fewer internal functions than known keypads which require space for a minimum of about ten keys.

The display device may be designed in many different ways. The symbols may be marked by using a marker, or by the symbols rolling over the display means, or by highlighting the symbols in colour or shading The technical solution of the display means may vary according to need and desire. The display means may also be supported by an audible signal from the apparatus.

What is claimed is:

1. A keypad device suitable for stationary telephones, mobile telephones, cordless telephones, calculators, and remote controls comprising actuating means provided in or on a housing for stepwise movement thereof enabling selection from among a plurality of symbols, and confirming means for confirming any selection of one said symbol or successive ones of said symbols, wherein said actuating means and said confirming means are formed by a single, common finger operable maneuvering key, wherein said key is a wheel which is rotatable relative to said housing to enable selection of any of said symbols, and wherein said wheel is operable as said confirming means by pressing or bending the key to cause confirmation of a selected symbol to be carried out, wherein said wheel is coactively operable with a movable marker or cursor on a display device to select symbols shown on said display device, wherein said wheel upon movement thereof moves said marker or cursor along a menu of said symbols on said display device, and wherein confirmed symbols are successively shown on said display device.

2. A keypad device suitable for stationary telephones, mobile telephones, cordless telephones, calculators, and remote controls comprising actuating means provided in or on a housing for stepwise movement thereof enabling selection from among a plurality of symbols, and confirming means for confirming any selection of one said symbol or successive ones of said symbols, wherein said actuating means and said confirming means are formed by a single, common, finger operable maneuvering key, said key being slidable relative to said housing, and wherein said key is operable as said confirming means by a push-down action thereof relative to said housing to cause confirmation of a selected symbol to be carried out, wherein said key is coactively operable with a movable marker or cursor on a display device to select symbols shown on said display device, wherein said key is slidable in a rectilinear groove or curved track provided on a front face of the keypad device, wherein said key upon slide movement thereof moves said marker or cursor along a menu of said symbols on said display device, and wherein confirmed symbols are successively shown on said display device.

3. The keypad device according to claim 2, wherein said key is slidable in a groove or along a track provided in said housing.

4. A keypad device suitable for stationary telephones, mobile telephones, cordless telephones, calculators, and remote controls comprising actuating means provided in or on a housing for stepwise movement thereof enabling selection among a plurality of symbols on a display device, and confirming means for confirming any selection of one said symbol or successive ones of said symbols, wherein said actuating means and said confirming means are formed by a single, common, finger operable maneuvering key, said key being a toggle key, said key being slidable in a groove or along a rectilinear or curved track provided in said housing, and said key is tiltable transversely of the track for confirmation of election, wherein said toggle key is coactively operable with a movable marker or cursor on a display device to select symbols shown on said display device, wherein said toggle key upon movement to a toggle position thereof moves said marker or cursor along a menu of said symbols on said display device, and wherein said key is operable as said confirming means by a pushdown or pressing action thereof relative to said housing to cause confirmation of selected symbol to be carried out and shown on said display.

5. The keypad device according to claim 1 wherein the key is slidable in a rectilinear groove or curved track provided on a front face of the keypad device.

6. The keypad device according to claim 1 wherein said housing includes an aligning mask for selecting a required number or symbol when the wheel is turned in a stepwise fashion and the symbols or numbers are located on the wheel.

7. The keypad device according to claim 1, wherein said housing is shaped like an oblong, pen-like member.

* * * * *